July 29, 1969     A. J. CAMPANELLA     3,458,159
INDICATING SYSTEM

Filed June 16, 1965     2 Sheets-Sheet 1

ANGELO J. CAMPANELLA
INVENTOR.

BY William T. Fryer III
ATTORNEY

July 29, 1969  A. J. CAMPANELLA  3,458,159
INDICATING SYSTEM
Filed June 16, 1965  2 Sheets-Sheet 2

RANGE DEVIATION  RANGE  HORIZONTAL  VERTICAL

STEER

ANGELO J. CAMPANELLA
INVENTOR.

BY William T. Fryer III
ATTORNEY

United States Patent Office 3,458,159
Patented July 29, 1969

3,458,159
INDICATING SYSTEM
Angelo J. Campanella, Columbus, Ohio, assignor to Industrial Nucleonics Corporation, a corporation of Ohio
Filed June 16, 1965, Ser. No. 464,371
Int. Cl. B64c *13/50, 15/00, 17/00*
U.S. Cl. 244—1                          5 Claims

ABSTRACT OF THE DISCLOSURE

One embodiment of the present invention comprises at least two space vehicles for movement in a formation at a selected separation distance. One of the space vehicles carries means for producing nuclear radiation. On the other space vehicle is disposed means for receiving the nuclear radiation. The receiving means has means for indicating the difference between the selected separation distance and the range of one space vehicle from the other, derived from the intensity of the nuclear radiation. On the one space vehicle is disposed means for measuring the angular deviation of the source from the space vehicle's heading in a plane including the heading. One method includes selecting a desired formation position for the space vehicles by determining the separation distance and the angular deviation from one space vehicle to the other, and steering the space vehicle with the nuclear radiation responsive means to maintain the determined separation distance and angular deviation. The formation altitude can be selected and the space craft altitude measured in another embodiment, and the space craft also steered to maintain the selected altitude. In another embodiment, the formation angular deviations in mutually perpendicular planes, from the heading, are selected and the space vehicle is steered to maintain the determined separation, selected distance, and selected angular deviations.

---

The present invention is related to the use and control of space vehicles in flight. More particularly, the present invention is an apparatus and method for maintaining two or more space vehicles in a desired formation irrespective of weather or light conditions.

NEED FOR PRESENT INVENTION

The advent of space vehicles, such as satellites, airplanes, and helicopters, or the like, has made possible transportation between distant areas. Both commercial and military services have found substantial use for space vehicles. Frequently several space vehicles are flown in a formation to carry a large load of equipment or personnel to a designated landing field. These flights are easily formed and maintained in good weather, even at night, when running lights can be used. But in bad weather, lack of visibility prevents safe use of space vehicle formations, because there is no assurance that the space vehicles will not collide. For flying at night in bad weather or under blackout conditions, a selected position for each space vehicle relative to the others must be maintained. A successful apparatus and method for maintaining space vehicles in a selected formation can have significant usefulness.

OBJECTS OF THE INVENTION

The present invention has for one of its objects to provide apparatus and method for maintaining a space vehicle formation irrespective of weather conditions or the time of day.

It is another object of the present invention to increase the usefulness of space vehicles.

It is a further object of the present invention to permit two or more space vehicles to fly in a selected formation.

BRIEF DESCRIPTION OF INVENTION

These and other objects are provided by the present invention which can be briefly described as a method for maintaining a space vehicle formation with a system, in one embodiment, comprising a space vehicle with a radiant energy source. On another space vehicle in the formation is provided means responsive to the radiant energy radiation for measuring the angular deviation of the source from the space vehicle's heading in a plane including the heading. The radiant energy responsive means also measures the range of the source. The method, in one form, comprises the steps of (1) selecting a desired formation position for the space vehicles by determining the separation distance and the angular deviation from one space vehicle to the other, (2) measuring the angular deviation and range while in the formation, and (3) steering the space vehicle with the radiant energy responsive means to maintain the determined separation distance and angular deviation.

One apparatus embodiment can be described briefly as comprising at least two space vehicles for movement in a formation at a selected separation distance. On one of the space vehicles is disposed means for producing nuclear radiation. On the other space vehicle is disposed means for receiving the nuclear radiation. The receiving means has means for indicating the difference between the selected separation distance and the range of one space vehicle from the other, derived from the intensity of the nuclear radiation.

FIGURES BRIEFLY DESCRIBED

INTRODUCTION TO APPARATUS EMBODIMENTS

While the following description of the present invention refers to specific hardware, these references are by way of example. It will be apparent to one skilled in the art that other means can be utilized to carry out the disclosed function. For example, the helicopter is only one of several space craft that can be utilized. The gamma ray form of nuclear radiation is described, but other types, such as X-ray and bremsstrahlugn can be employed.

Figure 1:
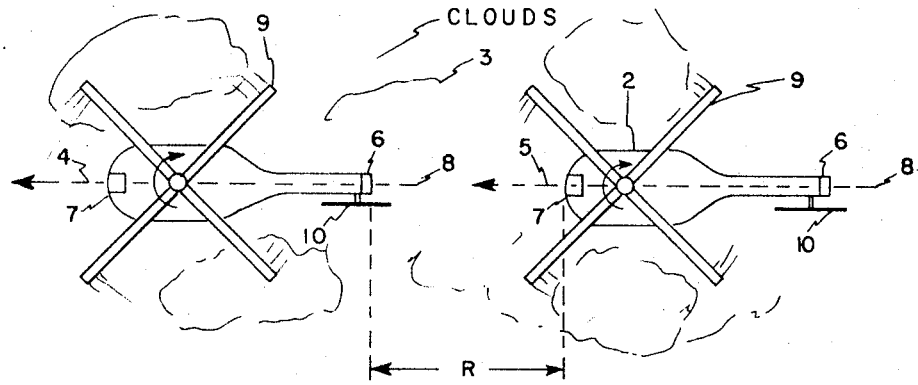
FIGURE 1 is a plan view of a helicopter formation to illustrate one form of operation of the present invention.

With reference to FIG. 1, a formation of helicopters 1 and 2 is shown flying through clouds 3. Each of helicopters 1 and 2 has a main rotor 9 and an auxiliary tail rotor 10 and a heading, denoted by the dotted lines 4 and 5, respectively, following the front-to-back dimension. Other types of helicopters or compound helicopters can be used. Obviously, a helicopter can move in almost any direction, irrespective of its heading. But while in formation the direction of movement is usually along the helicopter heading. As shown, helicopters 1 and 2 are flying in line with headings 4 and 5 in the same vertical plane and it will be assumed that the altitudes are the same.

A helicopter formation would be almost impossible to maintain in clouds 3. With more helicopters the chance of a collision increases. Even at night without clouds 3, a formation of military helicopters flying without lights under combat conditions is dangerous.

In accordance with the present invention, each of helicopters 1 and 2 have means for locating the other even in bad weather and maintaining a selected spacing R for the formation. The apparatus on each of helicopters 1 and 2 includes a source 6 of nuclear radiation, such as cobalt 60 producing gamma rays 8, mounted on the rear and radiating uniformly over a substantially solid angle to the helicopter rear and sides. On the front of each of helicopters 1 and 2 is a nuclear radiation detector 7 which receives the nuclear radiation from source 6.

The mounting and housing of source 6 is rigid and safe to prevent any accidents, even if there is a crash. Source 6 can be provided with a shield (not shown) to minimize radiation reaching the pilot's area. Construction of such sources and their housing are well known in the art. In addition, a shutter can be provided to close the source, either automatically or at the pilot's demand, when the helicopter is on the ground.

Figure 2:
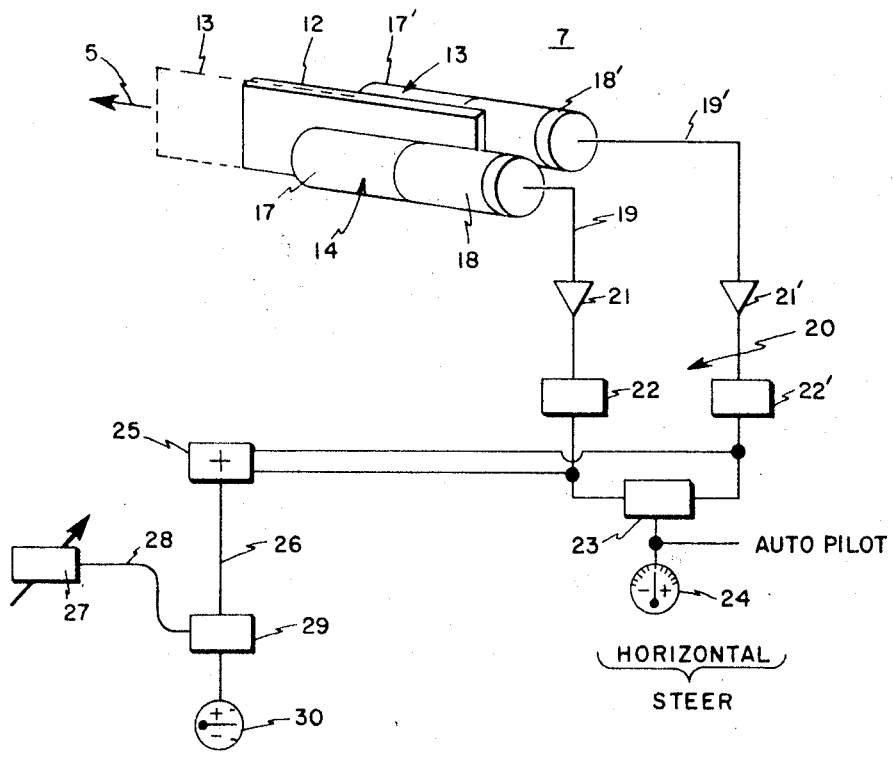
FIGURE 2 is a schematic diagram of one detector embodiment of the present invention to be mounted on the helicopters shown in FIG. 1.
Figure 3:
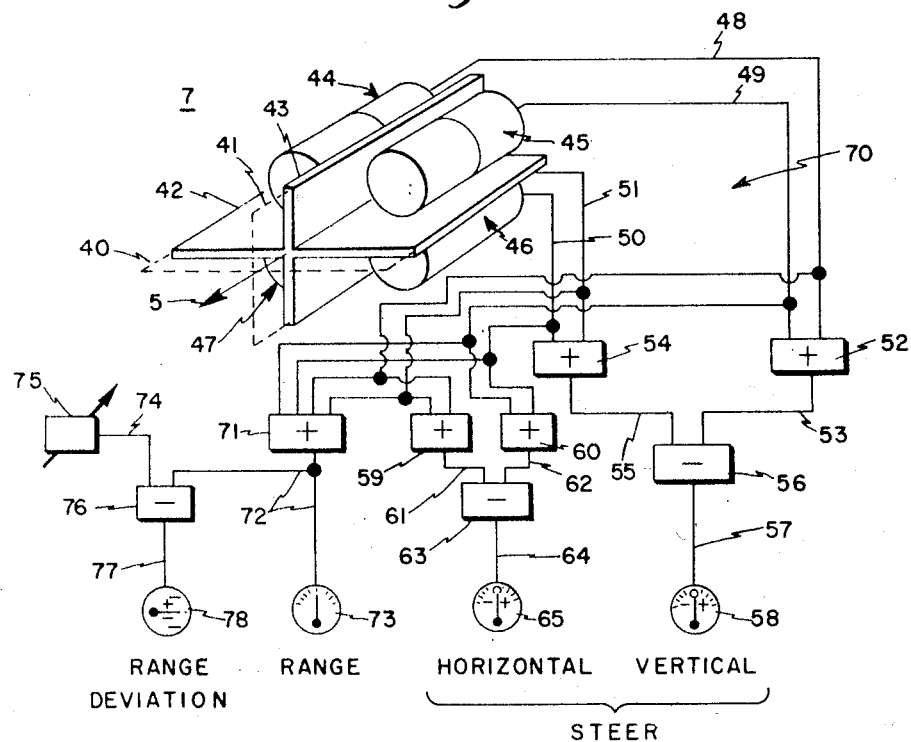
FIGURE 3 is a schematic diagram of another detector embodiment of the present invention to be mounted on the helicopters shown in FIG. 1.

Detector 7 can take several forms, such as the apparatus shown in FIGS. 2 or 3. In general, detector 7 is fixed to the helicopter and is capable of measuring the angular deviation of the helicopter heading from and the range to nuclear radiation source 6 on another helicopter. This information is compared with the selected formation angular deviation and distance for the helicopter to permit the pilot or an auto pilot to maintain the selected formation position.

Angle measuring apparatus similar to detector 7 shown in FIGS. 2 and 3 have been disclosed in prior patent applications assigned to the assignee of the present application. In application Ser. No. 271,342, filed Apr. 8, 1963 for "Nuclear System" a system for missile lift-off tracking utilized a shadow edge detector wherein gamma radiation was received equally on either side of a shield member when the shield member was pointed at the radioactive source on a missile during lift-off. Differences in the received radiation produced a signal that was a function of angular deviation of the source. In application Ser. No. 347,442 filed Feb. 26, 1964, for "Mid-Air Refueling System," a mid-air refueling system was disclosed that included two shadow edge detectors, one for elevation and one for azimuth, on the refueled aircraft to locate a radioactive source on the tanker aircraft. In application Ser. No. 357,494, filed Apr. 6, 1964, for "Position Indicating System," shadow edge detectors were used to measure the angular deviation of radioactive sources on the ground to provide landing information. In application Ser. No. 373,790, filed June 9, 1964, for "Navigating System," shadow edge detectors were used to track a source on the ground to provide landing information.

Detector 7 makes use of the above-described shadow edge detection principle, although other forms of angular deviation measurement can be used.

APPARATUS EMBODIMENT OF FIG. 2

In the embodiment of FIG. 2, assume it to be mounted fixedly on helicopter 2. A gamma radiation shield member 12 of rectangular shape is disposed between radiation sensors 13 and 14. Shield member 12 lies in a plane 15 (shown in dotted lines) which is disposed in line with helicopter heading 5, and vertical in normal flight (perpendicular to the plane of the drawing sheet of FIG. 1). The orientation allows radiation sensors 13 and 14 to measure azimuth changes in position of a source 6 carried on helicopter 1. Each of radiation sensors 13 and 14 comprise a scintillator crystal 17 and 17′, respectively, and a photomultiplier 18 and 18′, respectively, to provide a pulsating signal on lines 19 and 19′ with the frequency being a function of the radiation intensity. Scintillator crystals 17 and 17′ can be coated with a light opaque material, except at the sides facing the helicopter heading 5 and photomultipliers 18 and 18′, respectively, to channel the light produced by particle interaction with or energization by the gamma radiation.

The signals from radiation sensors 13 and 14 are processed in a computer 20 mounted in helicopter 2. After amplification and pulse shaping of signals on lines 19 and 19′ in amplifiers 21 and 21′, the resultant pulse train signals are coupled to separate discriminators 22 and 22′ which can be set to accept only a pulse amplitude corresponding to a range including the energy of the gamma radiation from source 6. The frequency of the pulse train signals from discriminators 22 and 22′ are compared by a ratio comparator 23 such as described in application Ser. No. 383,307, filed July 17, 1964, for "Ratio Computer," assigned to the assignee of the present application. The output of ratio comparator 23 is coupled to a meter 24 calibrated in azimuth degrees plus or minus from a heading directly toward source 6, corresponding to zero center position. Meter 24 provides steering information and an auto pilot (not shown), if available, can receive the signal from ratio comparator 23 to restore helicopter 2 to an azimuth heading toward helicopter 1.

The outputs from discriminators 22 and 22′ also are coupled to an adder 25 arranged to convert each pulse train signal to a D.C. voltage or current and add the voltage or current to produce a signal on line 26 that is a function of the total radiation intensity energizing radiation sensors 13 and 14.

The position of helicopter 2 in the formation includes a selected distance between or range, here identified as R (FIG. 1) to the helicopters. The distance R has a corresponding radiation intensity energizing detector 7 of helicopter 2 which can be measured and indicated on a calibrated meter. But the important information is the range deviation, the measured range minus the selected range or distance. Computer 20 provides the range deviation information by furnishing a D.C. reference signal from a reference generator 27, over line 28, to comparator 29, either a ratio or subtractor device. The reference signal can be adjusted to correspond to the D.C. signal that should be received on line 26 when the selected range is measured. The output from subtractor 29 is coupled to a meter 30 calibrated in units of distance plus or minus from a zero center position corresponding to equal measured and reference signals for the selected distance.

APPARATUS EMBODIMENT OF FIG. 3

The apparatus embodiment of detector 7 shown in FIG. 3 is capable of measuring the angular deviation of a gamma source on helicopter 1 in two mutually perpendicular planes 40 and 41 (dotted lines) intersection in heading 5. Similar shadow-edge detectors were disclosed in the above-mentioned patent applications. The arrangement includes rectangular gamma radiation shield members 42 and 43 which lie in planes 40 and 41 respectively and are fixed together. Shield members 42 and 43 are rigidly mounted on helicopter 2 so that the elongated sides extend in the direction of heading 5. Shield member 43 is vertically disposed when helicopter 2 is in normal flight (in a plane perpendicular to the plane of the sheet containing FIG. 1), while shield member 41 is horizontally disposed when helicopter 2 is in normal flight (in a plane parallel to the plane of the sheet containing FIG. 1). Symmetrically disposed about shield members 42 and 43 and rearward from the forward end of helicopter 2 are radiation sensors 44, 45, 46, and 47, each radiation sensor including a scintillation crystal and photomultiplier, arranged as described in connection with the apparatus embodiment of FIG. 2.

The pulse train output signals of radiation sensors 44, 45, 46, and 47 appear on lines 48, 49, 50, and 51, respectively, and are coupled to a computer 70. These signals are combined in computer 70 to provide a comparison of the sum of the radiation energizing radiation sensors 44 and 45, and the sum of the radiation energizing radiation sensors 46 and 47 to measure the vertical or elevation angular deviation. The output pulse train signals on lines 48 and 49 are each converted in adder 52 to a D.C. signal proportional to the pulse frequency and these D.C. signals are added, to produce a signal on line 53 which is a function of the sum of the radiation energizing radiation sensors 44 and 45. Similarly, the output signals on lines 50 and 51 are combined in adder 54 to produce a signal on line 55 which is a function of the sum of the radiation energizing radiation sensors 46 and 47. The signals on lines 55 and 53 are compared, either by a subtractor 56 or a ratio computer to produce a signal on line 57 which is a function of the difference between total radiation energizing radiation sensors 44 and 45 and the total radiation energizing radiation sensors 46 and 47. The signal on line 57 is coupled to a meter 58, having a zero center position and calibrated in degrees plus and minus from the zero position representing that the heading 5 of helicopter 2 is in the same horizontal plane as helicopter 1, i.e. at the same altitude, or has zero vertical angular deviation.

The azimuth angular measurement is obtained by computer 70 in much the same manner as the elevation or vertical angular measurement. The signals on lines 48 and 51 are combined in adder 59, while the signals on lines 49 and 50 are combined in adder 60. The resultant signals on lines 61 and 62 are a function, respectively, of the sum of the total radiation energizing radiation sensors 45 and 46 and 44 and 47. The signals on lines 61 and 62 are compared by subtractor 63, or a ratio computer, to obtain a signal on line 64 which is a function of the difference between the total radiation energizing radiation sensors 45 and 46 and the total radiation energizing radiation sensors 44 and 47. The signal on line 64 is coupled to a meter 65, having a zero center position, and calibrated in degrees plus and minus from the zero position which represents that heading 5 of helicopter 2 is in the same vertical plane as helicopter 1, i.e. is heading towards helicopter 1 in an azimuth direction or has zero horizontal angular deviation.

The radiation sensor outputs are combined in computer 70 to obtain a range measurement and to determine the range deviation from the selected formation position. The pulse train signals on lines 48, 49, 50, and 51 are coupled to adder 71 where each of these signals is converted into a D.C. signal which is a function of the pulse frequency.

The resultant D.C. signals are added to produce a signal on line 72 that is a function of the total radiation energizing radiation sensors 44, 45, 46, and 47. Discriminators can be inserted in each of lines 48, 49, 50, and 51 and adjusted to a selected pulse range including the energy range of the gamma radiation from source 6. The signal on line 72 is coupled to a meter 73, calibrated in units of distance to indicate the range of helicopter 1.

The range deviation indication is provided by computer 70. The signal on line 72 is compared with a signal on line 74 from reference generator 75, representing a selected range or distance spacing for helicopter 2 in the formation. The measured signal on line 72 and the reference generator signal on line 74 are coupled to a subtractor 76, having an output signal on line 77 which is a function of the difference between the reference generator signal and the measured signal. At the selected range or distance, the difference signal on line 77 is zero. Reference generator 75 can be adjusted to vary the selected distance. The signal on line 77 is coupled to a meter 78 calibrated in units of distance, plus and minus from a zero center position, to indicate range deviation.

METHOD OF FORMATION KEEPING

The apparatus embodiments of FIGS. 2 and 3 can be used to practice one or more methods of formation keeping. It is necessary at times for helicopters to fly in a formation and maintain the formation even in bad weather or during blackout conditions. Helicopters 1 and 2 (FIG. 1) should maintain the selected spacing R, fly in the same direction, and fly at the same or a selected altitude spacing. Each of helicopters 1 and 2 are equipped with altimeters and compass that the pilot can use in maintaining altitude and direction. But, normally, the pilot must relay on visual contact to stay in formation in azimuth, if the formation changes direction, and to maintain the selected separation distance.

Figure 4:
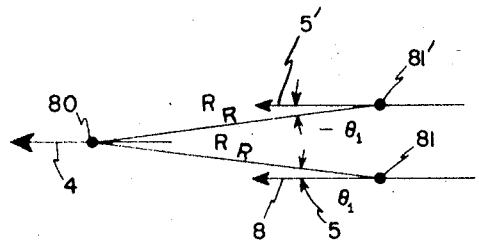
FIGURE 4 is a diagram for illustrating the method and operation of the illustrated apparatus embodiments of the present invention.

In FIG. 4 is shown a simplified diagram of the formation of helicopters 1 and 2. Assume that source 6 of helicopter 1 is located at point 80 and radiates a wide solid angle of gamma radiation reaching point 81, assumed to be the location of detector 7 on helicopter 2. The selected spacing is again represented as R. It will be assumed that FIG. 4 is a plan view, just as in FIG. 1. An altitude was selected for the formation and the pilot maintains this altitude by observing his altimeter. Detector 7 measures the azimuth or horizontal angular deviation $\theta_1$ of helicopter 1 from heading 5 of helicopter 2. An azimuth angular deviation of $\theta_1$ was selected for the formation, so that helicopters 1 and 2 move in the same direction with helicopter 2 laterally off-set. The pilot continuously monitors the horizontal indication, meter 24 of the apparatus of FIG. 2, or meter 65 of the apparatus of FIG. 3, and steers helicopter 2 to maintain the selected azimuth angular deviation $\theta_1$. Meters 24 or 65 will read to the plus side indicating the degrees of deviation.

The pilot also monitors the range deviation meters 30 (FIG. 2) or 78 (FIG. 3) and adjusts the speed of helicopter 2 to maintain a zero range deviation, corresponding to the selected formation distance R for helicopter 2. The reference generators 27 or 75 are set to produce a signal corresponding to the measured signal on lines 26 and 72, respectively, when helicopter 2 is at the selected separation distance R. Information received by the pilot allows him to stay in formation. If helicopter 1 should turn in another direction, the pilot would immediately note the change in azimuth angular deviation and steer helicopter 1 in a heading to obtain a constant measured azimuth angular deviation $\theta_1$.

There are two positions of helicopter 2 where an azimuth angular deviation of $\theta_1$ is measured. As shown in FIG. 4, helicopter 2 can move to a location where detector 7 is positioned at point 81' and moving in the direction of heading 5'. An azimuth angular deviation of $-\theta_1$ will be indicated by meters 24 or 65, the meter needle moving to the opposite side of zero from the indication at position 81 with the same amount of deflection. The separation distance R can be maintained. Thus detector 7 will indicate which lateral side helicopter 2 is with reference to helicopter 1 in a horizontal or azimuth plane.

The helicopter formation can be in line, so that the measured azimuth angular deviation $\theta$ is zero at a separation distance of R. All the pilot needs to do is maintain the selected altitude by reference to his altimeter, steer to maintain zero azimuth angular deviation, and maintain zero range deviation.

The embodiment of detector 7 in FIG. 3 has particular advantage for formation keeping. The pilot can use the altimeter for altitude measurement and assume a constant selected altitude. But the formation altitude may have to change. Detector 7 (FIG. 3) provides information on azimuth and elevation angular deviation of helicopter 1. The formation position is determined, including separation distance, azimuth angular deviation, and elevation angular deviation. The pilot of helicopter 2 then steers to maintain the selected azimuth and elevation angular deviation. Reference generator 75 was net to produce a signal corresponding to the selected range, and the pilot controls the helicopter speed to maintain zero range deviation.

A picture of the formation relationship using the apparatus embodiment of FIG. 3 can be seen by reference to FIG. 4, now assuming that the view is an elevation and $\theta_1$ is an elevation or vertical angular deviation measurement. A selected elevation deviation $\theta_1'$ or $-\theta_1'$ can be maintained. At the same time the azimuth angular deviation $\theta$ is measured and maintained at the selected value, and the separation distance R is maintained by monitoring the range deviation meter 78 and adjusting the helicopter speed.

OTHER ALTERNATIVE EMBODIMENTS

While the method of present invention has been described with reference to two apparatus embodiments, it will be apparent to one skilled in the art that there are other apparatuses that can be arranged to practice one or more of the methods.

The angular deviation apparatus can utilize several kinds of radiant energy, including radio, light, ultraviolet, infrared, to obtain the directive measurement, while the detector may be of several constructions, either fixed as shown herein, or tracking to measure angular deviation from reference positions. The type of radiation sensors used depends on the kind of radiant energy. The computer is designed to be compatible with the radiation sensors and to process the signals to obtain a range, azimuth and/or elevation angular deviation measurements, and to indicate range deviation in the formation. A scanning collimated radiation sensor can be used and the measured intensity display on an indicator, like a radar PPI scope to obtain the azimuth angular deviation, for example.

Space craft other than helicopters can utilize the present invention. Space platforms, satellites may have to fly in close formations. The advantage in using it with helicopters in military operations is significant.

The detector of either FIGS. 2 or 3 can be mounted on a plate which is fixed to the helicopter and removable to rotate the position of the shield member(s) with respect to the helicopter heading. The new position can be at an angular deviation(s) corresponding to the selected angular deviation, so that the horizontal and vertical angular deviations indicated will be zero when the helicopter is in the selected formation position.

It is also apparent that modifications can be made to the illustrated apparatus without departing from the present invention.

While other apparatus embodiments can be used, the illustrated embodiments have several unique features and advantages. Helicopters are used in large formations and all weather and blackout operations are important. Nuclear radiation, such as gamma rays, penetrates the weather and darkness and provides extremely accurate information on position using the disclosed shadow-edge detector. Measurements can be translated into actions by the pilot or through an automatic pilot, to maintain the helicopter's position in the formation.

The scope of the present invention is defined by the appended claims.

What is claimed is:

1. A space vehicle formation keeping system, comprising at least two space vehicles for movement in a formation at a selected separation distance, means for producing radiant energy on one of said space vehicles, means for receiving said radiant energy on the other of said space vehicles, said receiving means having means for generating a reference signal corresponding to said selected separation distance, means for producing a signal responsive to said received radiant energy intensity and thereby the distance between said space vehicles, and means for indicating the difference between said reference signal and said radiation energy responsive signal, said indicated difference being a function of the difference between said selected range and the distance to said one space vehicle from said other space vehicle.

2. A space vehicle formation keeping system, comprising at least two space vehicles for movement in a formation at a selected separation distance, a radiant energy source mounted on one of said space vehicles for radiating over a wide solid angle of radiation away from said one space vehicle, a detector mounted on said other space vehicle for receiving said radiant energy and producing a signal responsive to the received radiation intensity, computer means coupled to receive said detector signal, comprising a variable reference signal generator set to produce a reference signal for said selected separation distance and means for comparing said detector signal and said reference signal to produce a third signal that is a function of the difference between the range of said one space vehicle and said selected separation distance, and means for indicating said third signal to display said difference to the pilot of said other space vehicle.

3. Apparatus for use with a helicopter having forward and tail portions and a gamma radiation producing radioisotope source mounted in the tail portion and collimated to radiate principally to the rear and sides of the helicopter to produce a substantially uniform solid angle of radiation, said apparatus comprising a second helicopter having forward and tail portions, a radiation sensing means fixedly mounted on said second helicopter forward portion, to receive gamma radiation from the source and producing a signal responsive to the received gamma radiation intensity, computer means coupled to said detector signal and comprising a variable reference signal generator set to produce a reference signal for a selected separation distance and means for comparing said detector signal and said reference signal to produce a third signal that indicates the range deviation of said source from a selected formation spacing and to indicate the angular deviation of the source from the heading of said second helicopter in at least one plane.

4. Apparatus for use with a helicopter having forward and tail portions and a gamma radiation producing radioisotope source mounted in the tail portion and collimated to radiate principally to the rear and sides of the helicopter to produce a substantially uniform solid angle of radiation, said apparatus comprising a second helicopter having forward and tail portions, a radiation sensing means fixedly mounted on said second helicopter forward portion, to receive gamma radiation from the source, computer means coupled to said detector to indicate the range deviation of said source from a selected formation spacing and to indicate the angular deviation of the source from the heading of said second helicopter in at least one plane, said radiation sensing means comprising a first shadow-edge detector aligned with the heading of said second helicopter heading and arranged to measure the azimuth angular deviation of said source, said computer means receiving the signals from said shadow-edge detector, indicating said azimuth angular deviation, and adding said signals to produce a measured signal which is a function of the range to the source, and said computer means including means for generating a reference signal corresponding to the measured signal when the helicopters are at a selected range, and means for comparing said reference signal with said measured signal to obtain an indication when said measured signal is equal to said reference signal.

5. Apparatus for use with a helicopter having forward and tail portions and a gamma radiation producing radioisotope source mounted in the tail portion and collimated to radiate principally to the rear and sides of the helicopter to produce a substantially uniform solid angle of radiation, said apparatus comprising a second helicopter having forward and tail portions, a radiation sensing means fixedly mounted on said second helicopter forward portion, to receive gamma radiation from the source, computer means coupled to said detector to indicate the range deviation of said source from a selected formation spacing and to indicate the angular deviation of the source from the heading of said second helicopter in at least one plane said radiation sensing means comprising a first shadow-edge detector aligned with the heading of said second helicopter and arranged to measure the azimuth angular deviation of the source, a second shadow-edge detector aligned with the heading of said second helicopter and arranged to measure the elevation angular deviation of the source, said computer receiving the signals from said first and second shadow-edge detectors and indicating said azimuth and elevation angular deviations, and adding said signals to produce a measured signal which is a function of the range to the source, and said computer means including means for generating a reference signal corresponding to the measured signal when the helicopters are at a selected range, and means for comparing said reference signal with said measured signal to obtain an indication when said measured signal is equal to said reference signal.

References Cited

UNITED STATES PATENTS

| | | | |
|---|---|---|---|
| 2,489,221 | 11/1949 | Herbold | 33—46 |
| 3,173,137 | 3/1965 | Byrne | 343—112.4 |
| 3,285,533 | 11/1966 | Jernigan | 244—1 |
| 3,285,544 | 11/1966 | Chope et al. | 244—135 |

FOREIGN PATENTS 664,192    1/1952    Great Britain.

FERGUS S. MIDDLETON, Primary Examiner

U.S. Cl. X.R.

244—77; 343—112